United States Patent
Järvinen et al.

(10) Patent No.: US 12,157,675 B2
(45) Date of Patent: Dec. 3, 2024

(54) METHOD OF EXTRACTING AND CARBONATING CALCIUM FROM ALKALINE INDUSTRIAL WASTE OR BY-PRODUCT MATERIALS

(71) Applicant: Aalto University Foundation sr, Aalto (FI)

(72) Inventors: Mika Järvinen, Aalto (FI); Sanni Eloneva, Espoo (FI)

(73) Assignee: Aalto University Foundation sr, Aalto (FI)

( * ) Notice: Subject to any disclaimer, the term of this patent is extended or adjusted under 35 U.S.C. 154(b) by 634 days.

(21) Appl. No.: 17/299,803

(22) PCT Filed: Dec. 4, 2019

(86) PCT No.: PCT/FI2019/050871
§ 371 (c)(1),
(2) Date: Jun. 4, 2021

(87) PCT Pub. No.: WO2020/115369
PCT Pub. Date: Jun. 11, 2020

(65) Prior Publication Data
US 2022/0024778 A1   Jan. 27, 2022

(30) Foreign Application Priority Data
Dec. 4, 2018   (FI) ..................... 20186047

(51) Int. Cl.
| | | |
|---|---|---|
| *C01F 11/18* | (2006.01) | |
| *C22B 7/00* | (2006.01) | |
| *C22B 7/04* | (2006.01) | |
| *C22B 26/20* | (2006.01) | |

(52) U.S. Cl.
CPC ............ *C01F 11/181* (2013.01); *C22B 7/007* (2013.01); *C22B 7/04* (2013.01); *C22B 26/20* (2013.01)

(58) Field of Classification Search
CPC .................................................. C01F 11/181
See application file for complete search history.

(56) References Cited

U.S. PATENT DOCUMENTS

| | | |
|---|---|---|
| 2011/0139628 A1 | 6/2011 | Teir et al. |
| 2013/0064752 A1 | 3/2013 | Kim et al. |
| 2013/0078168 A1 | 3/2013 | Kim et al. |
| 2013/0164198 A1 | 6/2013 | Karbarz |
| 2014/0127096 A1* | 5/2014 | Komon ............... C22B 26/20 423/158 |
| 2017/0240432 A1 | 8/2017 | Jung et al. |

FOREIGN PATENT DOCUMENTS

| | | |
|---|---|---|
| CN | 101058852 A | 10/2007 |
| CN | 102963894 A | 3/2013 |
| CN | 102992372 A | 3/2013 |
| CN | 103030166 A | 4/2013 |
| CN | 104073650 A | 10/2014 |
| CN | 104114721 A | 10/2014 |
| CN | 107311111 A | 11/2017 |
| FI | 122348 B | 12/2011 |
| KR | 20180043903 A | 5/2018 |
| WO | WO2015168159 A1 | 11/2015 |
| WO | WO2017162901 A1 | 9/2017 |

OTHER PUBLICATIONS

Perry et al: Perry's Chemical Engineers' Handbook, Passage, 6th Edition, Jan. 1, 1997.
Said et al: Pilot-scale experimental work on carbon dioxide sequestration using steelmaking slag. Applied Energy, Jun. 1, 2016, vol. 177, pp. 602-611.
Huang: Rare earth extraction technique. Metallurgical Industry Press, Jun. 30, 2006, pp. 167-168.
Zhang: Ultrafine crushing equipment and applications thereof. Metallurgical Industry Press, Jan. 31, 2005, p. 4.

* cited by examiner

*Primary Examiner* — Stuart L Hendrickson
(74) *Attorney, Agent, or Firm* — Laine IP Oy

(57) ABSTRACT

The present invention concerns a process for producing calcium carbonate from a calcium-containing alkaline slag material, the process containing the steps of
- extracting the alkaline slag material in a series of extraction steps, including at least 2 extraction steps, using extraction solvent(s) containing salt in an aqueous solution, whereby a calcium-containing filtrate and a residual slag is formed in each extraction step,
- separating the residual slag from the filtrate after each extraction step,
- carrying each residual slag to the following extraction in the series of extractions, to be used as raw material in said following extraction, and discarding the residual slag separated from the last extraction,
- carrying each filtrate to the previous extraction in the series of extractions, to be used as extraction solvent in said previous extraction, and carrying the first filtrate, separated from the first extraction step, to a carbonating step,
- carbonating calcium as calcium carbonate from the first filtrate, the first filtrate also used as the carbonation solvent, and using a carbonation gas, whereby calcium carbonate precipitates,
- separating and recovering the calcium carbonate from the remaining carbonation solvent, and
- recycling the remaining carbonation solvent to the last extraction step in the series of extraction steps, to be used as extraction solvent.

13 Claims, 3 Drawing Sheets

METHOD OF EXTRACTING AND CARBONATING CALCIUM FROM ALKALINE INDUSTRIAL WASTE OR BY-PRODUCT MATERIALS

BACKGROUND OF THE INVENTION

Field of the Invention

The present invention concerns a method for extracting calcium from alkaline industrial waste or by-product materials such as steelmaking slag or combustion fly ashes and bottom ashes in high yields, and subsequently carbonating the extracted calcium as calcium carbonate, leaving low yields of residual calcium in the remaining slags and ashes.

Description of Related Art

In the following, we have described the background of the invention by referring to some existing solutions to some of the existing problems. However, reference to any art is not, and should not be taken as an acknowledgment or any form of suggestion that this art forms part of the common general knowledge in any country.

Iron and steel manufacturing is one of the biggest industries in the world, producing annually more than one billion metric tons of steel. Slag is produced in large amounts as a by-product from iron- and steelmaking processes. The current uses are mainly limited to its processing into cement aggregate, road construction, and liming material. The steel industry also accounts for approximately 6-7% of the total anthropogenic $CO_2$ emissions to the atmosphere.

The slag does, however, contain many components, such as calcium (Ca), silicon (Si), iron (Fe), magnesium (Mg), aluminium (Al), manganese (Mn), vanadium (V), and chromium (Cr), which could be valuable when separated from the rest of the slag.

Synthetic calcium carbonate, or precipitated calcium carbonate (PCC), is today produced by three different processes: a lime-soda process, a calcium chloride process, and a calcination/carbonation process.

These common PCC production processes require the oxide or hydroxide of calcium as raw material, which is typically produced by calcining limestone, and causes significant $CO_2$ emissions. The used virgin limestone is also required to contain low levels of impurities in order to provide high-quality PCC.

The separation of various desired components, such as said calcium, from alkaline waste or by-products, such as iron- and steelmaking slag, has been carried out in the past, for example by converting the alkali metals of the slag into carbonates using carbon dioxide ($CO_2$) gas in water.

In the process described in FI122348, calcium is extracted from slag using a salt formed from a weak acid and a weak base, followed by a precipitation step. However, the yield of the process is low, due to the limitations of the single extraction step, and it will leave a residual slag that still contains a calcium content that is too high to allow effective further processing.

US 2013064752 A1 and WO 2015168159 A1 both disclose similar processes, where the Ca from a slag is extracted, followed by a carbonation of the extracted solution, whereafter the precipitated carbonate is separated from the spent solvent, and the solvent is optionally recycled to the extraction step or to a separation step that follows the extraction step. The yield of carbonate will then be similar to the low yield obtained in the previously described process. Further, these publications fail to indicate how extractions could be carried out in series.

US 2017240432 A1 does describe a two-step extraction, but the second step is mainly intended as a purification that is required due to the use of a harsh extraction solution, i.e. hydrochloric acid, instead of the more commonly used milder salt solution.

There is, thus, still a need for more efficient calcium extraction.

SUMMARY OF THE INVENTION

The invention is defined by the features of the independent claims. Some specific embodiments are defined in the dependent claims.

According to a first aspect of the present invention, there is provided means for efficient utilization of alkaline waste materials.

According to a second aspect of the present invention, there is provided a process for efficiently extracting high yields of calcium from said alkaline waste materials using mild conditions.

According to a third aspect of the present invention, there is provided a process including two or more extraction steps carried out in series.

Thus, in the present invention, a new process for producing calcium carbonate is presented, which process provides a high yield of calcium carbonate, while leaving a spent waste material, or slag, with a sufficiently low calcium content to allow effective further processing.

The process of the invention also provides a suitable use for alkaline industrial waste or by-products, such as iron- and steelmaking slags (including blast furnace slag, steel converter slag, desulphurization slag, ladle slag, and argon oxygen decarburization slag) and ashes (including combustion fly ashes and bottom ashes etc.)

The process also has the potential to consume a substantial amount of the $CO_2$ from the flue gases of such industry. Most importantly, it is able to bind most of the $CO_2$ released during the lime kiln processing, wherein calcium carbonate ($CaCO_3$) is converted to calcium oxide (CaO), thus releasing carbon dioxide ($CO_2$). Further, by removing the calcium from the slag, it raises the concentration of other valuable components in the remaining residue, acting as a natural refining step.

The feasibility of the process in mainly determined by the cost of chemical make-up. The higher the cycle based (extraction+carbonation) Ca extraction and yield of PCC, the smaller is the loss of solvent per ton of PCC produced.

In addition, it is of high importance that the present process makes it possible to significantly decrease the CaO content of the residual slag. This results in a smaller physical amount of residual slag, which in turn will result in a lower cost of e.g. further processing or landfilling. Further, CaO in the residual slag increases the melting temperature, whereby a lower CaO content results in lower temperature and energy requirements.

PCC yield presents the fraction of actual measured mass of PCC obtained divided by the theoretical mass of PPC that could be produced i.e. $m_{PCC} / \left( m_{CaO}^0 \frac{M_{CaCO_3}}{M_{CaO}} \right)$.

Figure 2:
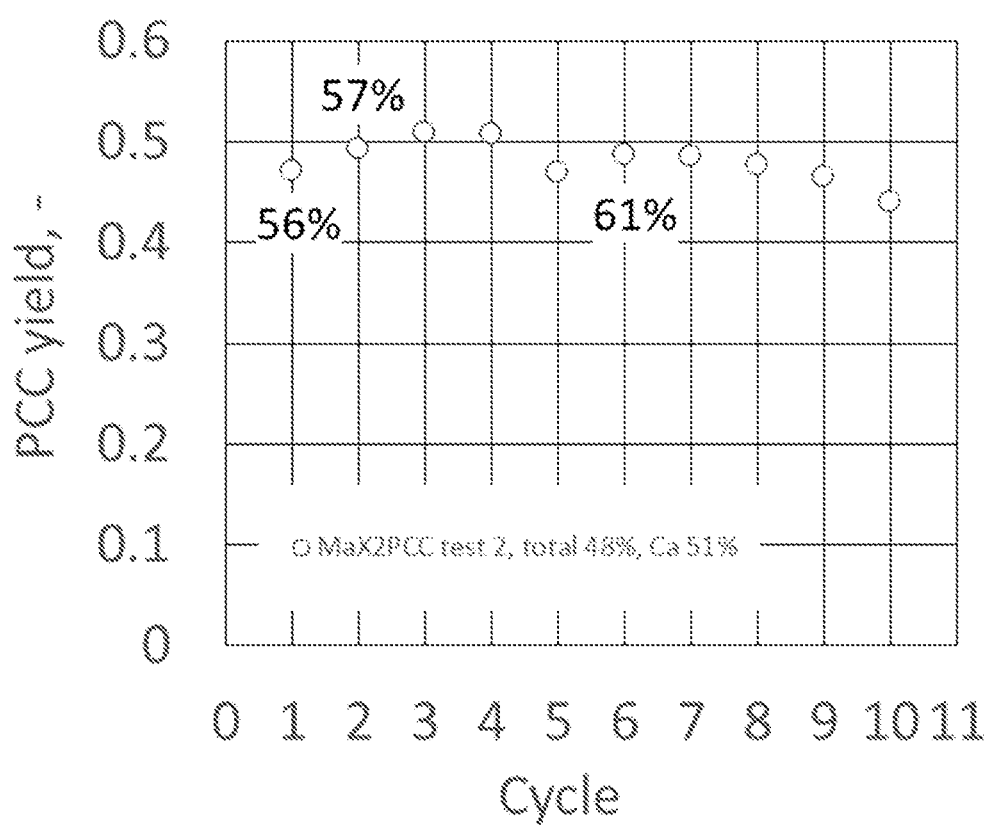
FIG. 2 is a graphical illustration of the PCC yield efficiency of the process, in terms of the yield of precipitated calcium carbonate (PCC) during the first 10 cycles, each combined from 2 extraction steps and 1 carbonation step.

The numbers in FIG. 2 represent the Ca extraction yields obtained from solvent chemical analysis.

Figure 3:
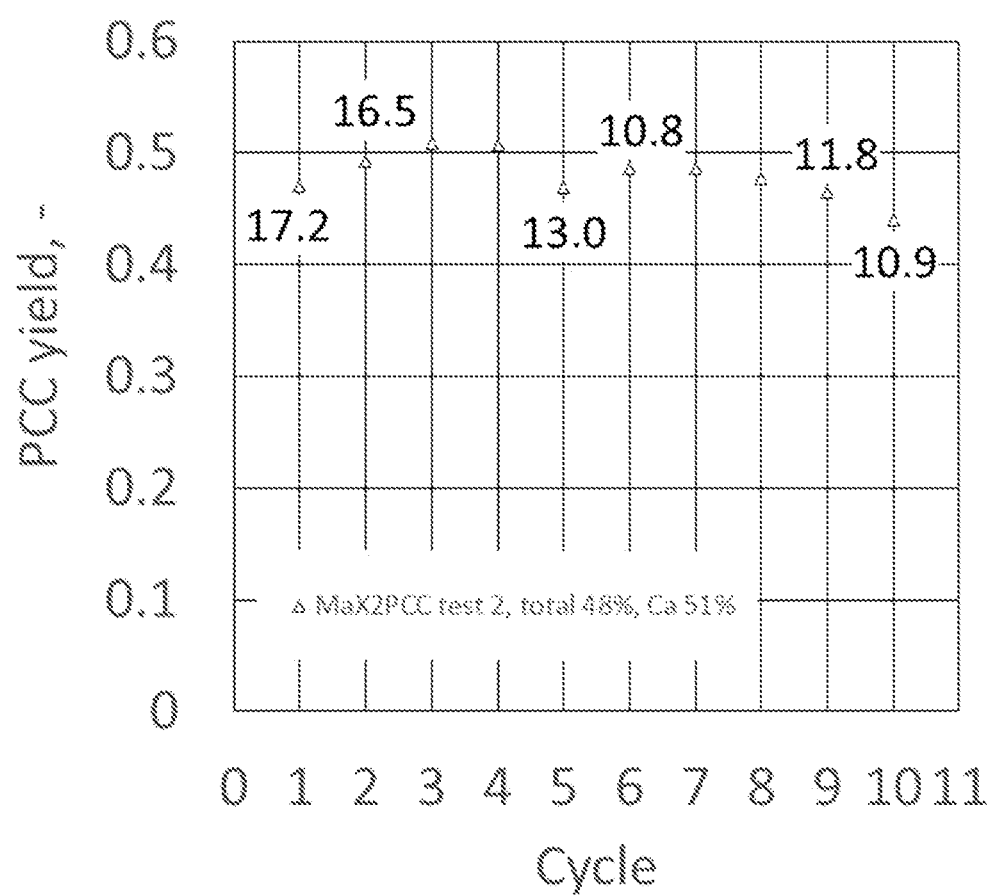

FIG. 3 is a graphical illustration of the PCC-yield of precipitated calcium carbonate (PCC) in terms of fractions. In addition to this, the numbers in the Figure give the vanadium (V) concentration in the solvent (mg/L), showing that no V accumulation takes place, and therefore, the recyclability of the solvent can be maintained.

EMBODIMENTS OF THE INVENTION

Definitions

In the present context, the term "alkaline slag material" is intended to cover industrial waste or by-product materials, such as iron- and steelmaking slags of the iron- and steelmaking industry, preferably selected from blast furnace slag, steel converter slag, electric arc furnace slag (EAF slag), chrome converter slag, ferrochrome slag, desulphurization slag, ladle slag and argon oxygen decarburization slag (AOD slag), as well as calcium-containing materials of the cement or paper industries, and waste concrete or municipal waste. It also refers to different ash related products such as ashes from power plants, ashes from municipal solid waste incinerators, de-inking ash from paper recycling, suitable examples being combustion fly ash, combustion bottom ash and sewer sludge ash.

The present invention concerns a process for producing calcium carbonate from a calcium-containing alkaline slag material, the process including the steps of (see FIG. 1):
extracting the alkaline slag in a series of extraction steps, including at least two extractions, using extraction solvent(s) containing salt in an aqueous solution, whereby a calcium-containing filtrate and a residual slag is formed in each extraction step,
separating the residual slag from the filtrate after each extraction step,
carrying each residual slag to the following extraction in the series of extractions, to be used as raw material in said following extraction, and discarding the residual slag separated from the last extraction,
carrying each filtrate to the previous extraction in the series of extractions, to be used as extraction solvent in said previous extraction, and carrying the first filtrate, separated from the first extraction step, to a carbonating step,
carbonating calcium as calcium carbonate from the first filtrate, the first filtrate also used as the carbonation solvent, and using a carbonation gas, whereby calcium carbonate precipitates,
separating and recovering the calcium carbonate from the remaining carbonation solvent, and
recycling the remaining carbonation solvent to the last extraction step in the series of extraction steps, to be used as extraction solvent.

Thus, the extraction steps of the present process are carried out in series, whereas all the extraction steps typically are operated counter-currently.

The fresh extraction solvent can be added to any of the extraction steps. Thus, fresh make-up solvent can be added to one or more of the extraction steps. If added to only one step, the fresh solvent is preferably added to the last extraction step, whereas the remaining extraction steps are operated using the filtrates fed counter-currently from the subsequent extraction step, or from the carbonating step.

Typically the fresh extraction solvent is an aqueous solution formed of a salt including a weak base, preferably an aqueous solution of an ammonium salt, such as ammonium acetate ($CH_3COONH_4$), ammonium chloride ($NH_4Cl$), ammonium nitrate ($NH_4NO_3$) or a mixture of two or more such salts. It is, however, even more preferred to use an aqueous solution of a salt formed of a weak acid and a weak base, such as an aqueous solution of ammonium chloride ($NH_4Cl$).

The salt concentration of the first extraction solvent is preferably 0.2 to 5 M, more preferably 0.5 to 2 M.

Typically, the first extraction solvent is mildly acidic, such as having a pH value of 5-7, preferably about 6.

The extraction with ammonium chloride is presented in the following Equation 1:

$2NH_4Cl(aq) + CaO \cdot SiO_2(s) + H_2O(l) \rightarrow Ca^{2+} + 2Cl^- + 2NH_4OH(aq) + SiO_2(s)$ (Equation 1)

wherein the formula of the alkaline slag product has been simplified as $CaO \cdot SiO_2$, although calcium (and many other compounds) may exist in several different phases in these slag products.

The first extraction step is typically able to extract 20-40% of the calcium from the slag.

Additional extraction steps are required to increase the Ca yield.

The solvent separated from the carbonation step will have a slightly higher pH, compared to the fresh extraction solvent, such as a pH of 7-8, or about 7.5.

According to an embodiment of the present invention, the first extraction step is preceded by a step of effective mixing or wet milling of the raw material, preferably in the presence of fresh extraction solvent. One option is to carry out the wet milling simultaneously with the first extraction step. This is later referred to as extractive grinding.

According to a preferred embodiment of the invention, a series of 2 to 30 counter current extraction steps are used in the process, preferably 2 to 3, arranged so that the residual slag separated from each extraction step is carried to the following extraction step, whereas the filtrate separated from each extraction step is carried to the preceding extraction step.

The pH of the filtrate increases from the last to the first extraction, from 7.5 to 9.5.

More importantly, the filtrates will contain all of the calcium that has been successfully extracted from the residual slags. These further portions of calcium will thus be recycled to the preceding extraction steps, instead of being discarded. Thus, an increased yield of extracted calcium will be obtained using the present process.

The extraction steps are carried out as known in the art, but preferably at a temperature of 10-90° C., more preferably 20-70° C., most suitable 20-25° C. The higher the temperature, the higher the loss of $NH_3$ due to higher vapor pressure.

In a preferred embodiment of the invention, only one carbonation step is included in the process.

The carbonation step is carried out on the filtrate separated from the first extraction step.

The gas used in the carbonation is typically $CO_2$ or a $CO_2$-containing gas, preferably $CO_2$-containing flue gas of the iron- and steelmaking industry and preferably the product gas from the lime kiln process, where $CO_2$ is released from the $CaCO_3$ when CaO is produced.

The carbonation is preferably carried out by bubbling the carbonation gas through the filtrate to be carbonated, or by spraying the filtrate into a flue gas scrubber.

The carbonation preferably takes place at a temperature of 0-100° C., preferably 10-70° C., more preferably 10-30° C. Typically, the carbonation proceeds according to the following Equation 2:

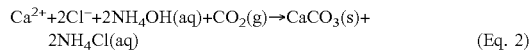

$$Ca^{2+}+2Cl^-+2NH_4OH(aq)+CO_2(g)\rightarrow CaCO_3(s)+2NH_4Cl(aq) \quad \text{(Eq. 2)}$$

A further recycling step can be included in the present process, by conducting the stream of $CO_2$-lean gas, used for carbonation, away from the carbonation step, to be condensed and recycled. Since this stream of $CO_2$-lean gas contains a minor amount of evaporated solvent, the condensate can be combined with the remaining carbonation solvent to be recycled to the last extraction step.

Thus, according to a preferred embodiment, the process is carried out using the following equipment (see FIG. 1):

A first extraction unit $E_1$, to which the raw material is fed through a feed line $S_0$. The extraction that is carried out in said first extraction unit $E_1$ is followed by a separation of the solids and the filtrate, whereafter the solids are carried further via a first spent slag line $S_1$ to a second extraction unit $E_2$, and the filtrate is carried via a carbonating solvent line $L_{carb}$ to a carbonation unit C.

A second extraction unit $E_2$, to which the first spent slag is fed through a spent slag line $S_1$ from the first extraction unit $E_1$. The extraction that is carried out in said second extraction unit $E_2$ is again followed by a separation of the solids and the filtrate, whereafter the solids, i.e. the spent slag, are carried further through a second spent slag line $S_2$ to optional further extraction units, $E_3$-$E_n$, or to optional further processing, and the filtrate is carried via a last filtrate line $L_n$ to the first extraction unit $E_1$.

Optional further extraction units, $E_3$-$E_n$, arranged in series with the first and second extraction units, $E_1$ and $E_2$.

A carbonation unit C, to which filtrate is carried via the carbonating solvent line $L_{carb}$ from the first extraction unit $E_1$. The carbon dioxide used in the carbonation unit C is carried to the unit via a $CO_2$ line. The carbonation is followed by a step of separating the solids from the liquid, whereafter the solids (here the precipitated calcium carbonate, PCC) are collected via a PCC product line, and at least a portion of the separated liquid is carried via a recycled solvent line $L_{rec}$ to the last extraction unit $E_n$, where it is connected to the last extraction unit $E_n$ as a first filtrate line $L_1$.

Based on the above, the equipment can include several extraction units, $E_1$-$E_n$, an equal number of spent slag lines $S_1$-$S_n$, and an equal number of filtrate lines $L_1$-$L_n$. The spent slag lines $S_1$-$S_{n-1}$ are intended for carrying the spent slag downstream from each extraction unit $E_1$-$E_n$ to the subsequent one, while the filtrate lines $L_2$-$L_n$ are intended for carrying the filtrates upstream from each extraction unit E to the preceding one. Thus, the equipment is operated counter currently.

The final spent slag line $S_n$ is not connected to any further downstream extraction unit, but is instead intended for separating the final spent slag from the equipment.

The first filtrate line $L_1$ is similarly not connected to any further upstream extraction unit, but is instead intended for feeding solvent to the extraction system, the solvent being obtained from the carbonation unit C.

As mentioned above, the equipment includes, in addition to said spent slag lines $S_1$-$S_n$, a raw material feed line $S_0$, which feeds the raw material slag to the equipment.

Likewise, the equipment includes one or more feed lines $L_0$ for feeding fresh make-up solvent to one or more of the extraction units $E_1$-$E_n$, as well as a $CO_2$ line for feeding carbonation gas to the carbonation unit C.

Figure 1:
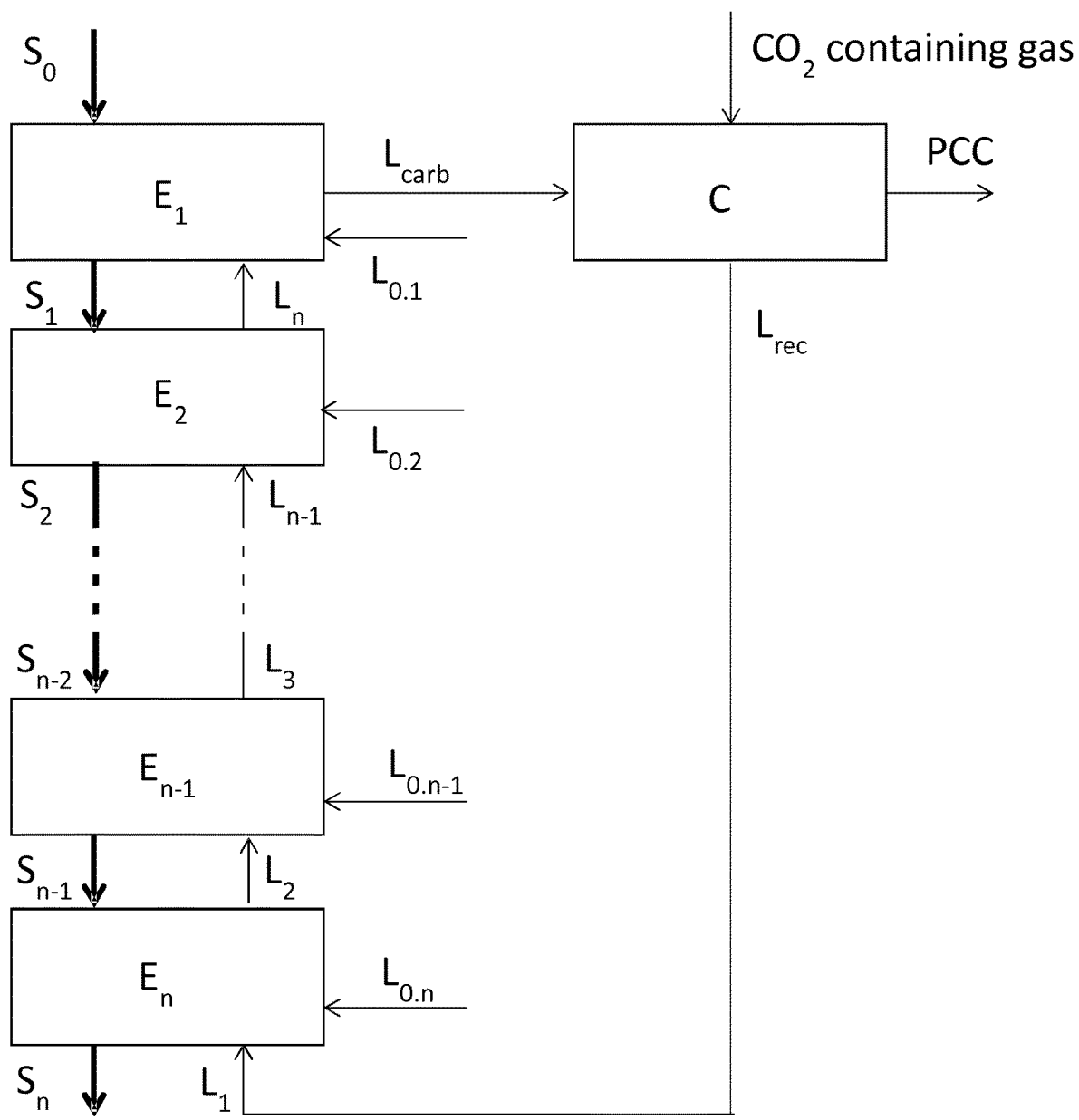
FIG. 1 is a schematic illustration of the process steps in accordance with some preferred embodiments of the present invention, with four extraction steps presented.

These units and lines are all shown in FIG. 1, which illustrates an embodiment of the invention with the equipment including four extraction units E, and with separate feed lines $L_0$ for fresh solvent connected to all extraction units E. The equipment of the invention does, however, not require such a number of extraction units E, and likewise does not require such a number of solvent feed lines $L_0$.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In this description, numerous specific details are provided to provide a thorough understanding of embodiments of the invention. One skilled in the relevant art will recognize, however, that the invention can be practiced without one or more of the specific details.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The following non-limiting example is intended merely to illustrate the advantages obtained with the embodiments of the present invention.

Example 1

Extraction and Carbonation of Calcium-Containing Slag

An alkaline industrial slag containing ~47% calcium oxide (CaO) was carried to a first extraction unit.

To the first extraction unit was fed also fresh solvent, having a pH value of about 6.

The extracted mixture was separated into a filtrate containing dissolved CaO, and a residual slag still containing extractable CaO. This unwashed residual slag was put aside, and the filtrate was carried further to the carbonation.

The filtrate separated from the residual slag contained dissolved CaO, and had a pH value of about 9.1. This filtrate was carried to a carbonation stage, where it was mixed with carbon dioxide ($CO_2$) to give precipitated calcium carbonate.

The filtrate obtained from the carbonation stage, having a pH value of about 7.5, was, in turn, used as extraction solvent in the second extraction stage.

The unwashed residual slag, that was put aside, was carried to a second extraction stage, where it was extracted using a regenerated solvent obtained from the carbonation stage, having a pH value of about 7.5. The residual slag from this second extraction unit, extracted twice, was found to be ready for further processing steps.

From said second extraction stage, the filtrate, having a pH value of about 8, was separated and was fed to the first extraction stage. To this first extraction step was also fed a new batch of fresh slag.

To continue the process, the slag from the first extraction step was again put aside, and the filtrate carried to the carbonation step.

The filtrate separated from the first residual slag contained dissolved CaO, and had a pH value of about 9.1. This filtrate was carried to a carbonation stage, where it was mixed with carbon dioxide ($CO_2$) to give precipitated calcium carbonate.

Again, after separation of the PCC from the filtrate, the solution used in the carbonation was fed to the second extraction step, and used to extract calcium from the unwashed residual slag that was put aside from the first extraction step.

A single cycle including 2 extraction steps and 1 carbonation step was experimentally repeated 10 times, showing that the effectiveness of the solvent remains, see FIGS. 2 and 3.

The results of the process, as indicated by the yield of precipitated calcium carbonate (PCC) following each cycle, are shown in FIGS. 2 and 3.

INDUSTRIAL APPLICABILITY

The present invention can be used in the processing of iron- and steelmaking slag, calcium-containing slags of the cement or paper industries, and waste concrete or municipal waste. It can also be used in processing different ash related products such as combustion fly ash, combustion bottom ash or sewer sludge combustion ash.

In particular, the present invention is useful when carried out in connection with the iron- and steelmaking processes.

REFERENCE SIGNS LIST $E_1$-$E_n$ Series of extraction units, from the first extraction unit, $E_1$, to the last extraction unit, $E_n$
C Carbonating unit
$S_0$-$S_n$ Series of sludge lines, from the alkaline sludge material line, S0, to the last spent slag line, $S_n$L1-Ln Series of filtrate lines, from the first filtrate line, $L_1$, to the last filtrate line, $L_n$.
$L_{0.1}$-$L_{0.n}$ One or more fresh solvent lines
$L_{carb}$ Filtrate line carrying the carbonating solvent
$L_{rec}$ Filtrate line carrying the spent carbonating solvent, which is to be recycled via the first filtrate line $L_1$ to the last extraction unit, $E_n$.
$CO_2$ line Feed line for the carbonating gas
PCC line Product line for recovery of the precipitated calcium carbonate product

CITATION LIST

FI122348
US 2013064752 A1
WO 2015168159 A1

The invention claimed is:

1. A process for producing calcium carbonate from a calcium-containing alkaline slag material, the process comprising:
   extracting the alkaline slag material in a series of extraction steps, including at least 2 extractions, using extraction solvent(s) containing salt in an aqueous solution, whereby a calcium-containing filtrate and a residual slag is formed in each extraction step,
   carrying out a step of extractive grinding simultaneously with a first extraction step of the series of extraction steps,
   separating the residual slag from the calcium-containing filtrate after each extraction step,
   carrying each residual slag to a following extraction in the series of extraction steps, to be used as raw material in said following extraction, and discarding the residual slag separated from the last extraction of the series of extraction steps,
   carrying each calcium-containing filtrate to a previous extraction in the series of extraction steps, to be used as an extraction solvent in said previous extraction, and
   carrying a first calcium-containing filtrate, separated from a first extraction step, to a carbonating step,
   carbonating calcium as calcium carbonate from the first calcium-containing filtrate, the first calcium-containing filtrate also used as a carbonation solvent, and using a carbonation gas, whereby calcium carbonate precipitates,
   separating and recovering the calcium carbonate from remaining carbonation solvent, and
   recycling the remaining carbonation solvent to the last extraction step in the series of extraction steps, to be used as extraction solvent.

2. The process of claim 1, wherein fresh extraction solvent is added to any of the extraction steps, wherein the remaining extraction steps are operated using the filtrates fed counter-currently from the subsequent extraction step, or from the carbonating step.

3. The process of claim 1, wherein fresh extraction solvent is added to any of the series of extraction steps, the fresh extraction solvent being an aqueous solution comprising an aqueous solution of an ammonium salt.

4. The process of claim 1, wherein fresh extraction solvent is added to any of the series of extraction steps, the fresh extraction solvent being an aqueous solution of ammonium chloride ($NH_4Cl$).

5. The process of claim 3, wherein the fresh extraction solvent has a pH value of 5-7.

6. The process of claim 1, wherein the alkaline slag material is an iron- and steelmaking slag.

7. The process of claim 1, wherein the carbonation gas is $CO_2$ or a $CO_2$-containing gas.

8. The process of claim 1, wherein the carbonation is carried out by bubbling the carbonation gas through the filtrate to be carbonated, or by spraying the filtrate into a flue gas scrubber.

9. The process of claim 1, wherein a stream of $CO_2$-lean gas, which did not react in the carbonation, is conducted away from the carbonation step, which stream of $CO_2$-lean gas contains an amount of evaporated first extraction solvent, which solvent is condensed and combined with the remaining carbonation solvent to be recycled to the last extraction step.

10. The process of claim 1, wherein the series of extraction steps are carried out at a temperature of 10-90° C.

11. The process of claim 1, wherein a series of 2-30 extraction steps is used.

12. The process of claim 1, further comprising, prior or concurrent step, prior to or simultaneously with to the first extraction step, wet milling the alkaline slag material.

13. The process of claim 12, wherein the wet milling is done simultaneously with the first extraction step.

* * * * *